United States Patent [19]
Lu et al.

[11] Patent Number: 5,588,334
[45] Date of Patent: Dec. 31, 1996

[54] CABLE CORE ADJUSTER WITH LOCK MEMBERS

[75] Inventors: Jian G. Lu, Troy; Ronald L. Beckmann, Rochester, both of Mich.

[73] Assignee: General Motors Corporation, Detroit, Mich.

[21] Appl. No.: 429,961

[22] Filed: Apr. 27, 1995

[51] Int. Cl.⁶ ............................................. F16C 1/10
[52] U.S. Cl. ................ 74/502.6; 74/502.4; 74/500.5; 74/501.5 R; 403/104; 403/379
[58] Field of Search .................. 74/500.5, 501.5 R, 74/502, 502.4, 502.6, 503; 403/104, 379, 345, 42

[56] References Cited

U.S. PATENT DOCUMENTS

| | | | |
|---|---|---|---|
| 4,887,930 | 12/1989 | Chaczyk et al. | 403/104 X |
| 5,163,338 | 11/1992 | Sharp et al. | 403/104 X |
| 5,199,321 | 4/1993 | Nowak | 74/501.5 R |
| 5,207,116 | 5/1993 | Sultze | 74/502.6 |
| 5,220,832 | 6/1993 | Petruccello | 74/500.5 |
| 5,394,770 | 3/1995 | Boike et al. | 74/502.4 |
| 5,398,566 | 3/1995 | Moore | 74/502.4 |
| 5,435,202 | 7/1995 | Kitamura | 74/502.4 |

*Primary Examiner*—Vinh T. Luong
*Attorney, Agent, or Firm*—Donald F. Scherer

[57] ABSTRACT

A cable mechanism has an adjustment portion which allows the cable length to be adjusted at assembly. A first movable lock member is provided to prevent inadvertent early adjustment of the cable length by stabilizing a lock member on the cable in an unadjusted position prior to removal of the first lock member. A second movable lock member is provided to maintain the cable lock portion in the adjusted position and to prevent inadvertent disconnection of the cable adjusting mechanism.

2 Claims, 4 Drawing Sheets

CABLE CORE ADJUSTER WITH LOCK MEMBERS

TECHNICAL FIELD

This invention relates to locking mechanisms for cable adjusters.

BACKGROUND OF THE INVENTION

Control cable assemblies or mechanisms are used with mechanical devices to permit remote manipulation by an operator. The cable assembly is generally designed to have excess length to allow for build tolerances in the mechanical devices as well as to accommodate attachment of the cable end to the mechanism to be operated. One such mechanical system is the manual shift control mechanism in an automatic transmission. The cable is connected between a manual control lever or operator control lever which is disposed on the vehicle steering column or floor console and to the transmission selector mechanism which is generally a pivotal lever mounted on the transmission casing.

In these systems, the cable is connected between the manual control lever and the transmission at assembly of the vehicle. Since build tolerances might interfere with a fixed length cable, an adjustable end is provided at the transmission selector mechanism. This will permit the installer to adjust the cable length and provide proper transmission alignment between the transmission indicator at the manual control lever and the transmission valving system which is operated by the transmission selector mechanism. This adjustment is accomplished by having a movable end at the transmission housing connection so that the two devices, the manual control lever and the transmission pivotal lever, can both be placed in a like drive condition, such as park, or manual low, and the cable length can be adjusted and locked into position.

After the locking has occurred, there is generally no further need to reposition or readjust the cable length. It is desirable to ensure the maintenance of the fixed cable length so that proper feedback to the operator is given during operation.

SUMMARY OF THE INVENTION

It is an object of this invention to provide a lock cover to prevent inadvertent cable length adjustment after the cable has been installed.

One aspect of this invention is seen in a cover member slidably disposed on an adjuster body of the cable assembly. The cable assembly is positioned between and attached to an operator control and a mechanism control, such as a cable fitted between a manual control lever and a transmission pivotal control lever. One end of the cable assembly has an adjuster body which permits the cable core to be adjusted to the proper length between the controls to which it is connected. A lock secured to the adjuster body is manipulated into engagement with an extension of the cable core to prevent further change in position between the adjuster body and the cable core, thereby maintaining the effective length of the cable assembly. The cover member is manipulated, as by sliding, along the adjuster body to a position overlapping the lock to prevent inadvertent removal thereof and thereby maintain the cable lock in the position established by the assembler.

DESCRIPTION OF THE PREFERRED EMBODIMENT

Figure 1:
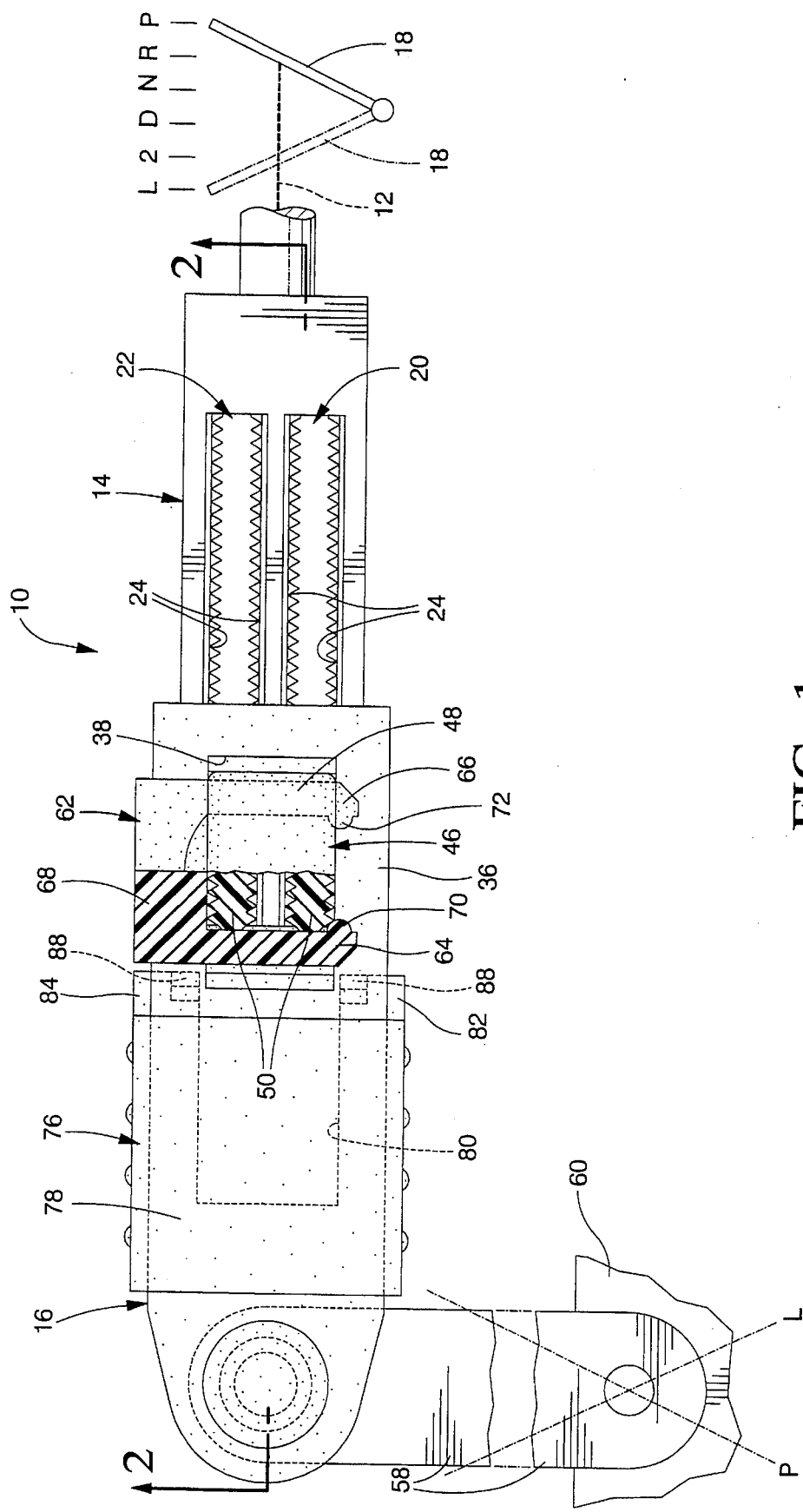
FIG. 1 is a top view depicting a portion of the cable assembly incorporating the present invention.

A cable assembly 10 includes a cable 12, an adjustable portion or body 14 and an adjustable body core 16. The cable 12 is operatively connected in a well known manner to a conventional operator control lever 18 for an automatic transmission. As is well known, these levers are movable by the operator to a plurality of positions to establish various drive conditions within the transmission, including a Park condition "P", a Reverse condition "R", a Neutral condition "N", a Drive condition "D", a Low Intermediate Drive "2", and a Low Drive "L". The Park position "P" and "L" position represent the extreme travels of the control system manual lever.

The adjustable portion or body 14 has a pair of channels 20 and 22 therein, each of which has side surfaces 24 that are toothed for substantially the entire length to provide a lock structure. The body core 16 has a central opening or recess 26 in which the adjustable portion 14 is partially disposed. The body core 16 has a transverse opening 28 having an upper portion 30 which is toothed, to provide a lock structure in a manner similar to the surfaces 24, and a lower opening 32 which is untoothed and extends outwardly through the bottom surface 34 of the body core 16. The body core 16 has an upper surface 36 in which a recess 38 is formed in a manner to provide an opening with the upper portion 30 of the opening 28.

The recess 26 has disposed therein one or more helical springs 40 which are disposed in abutment between a wall 42 of the recess 26 and a wall 44 which forms one end of the adjustable portion 14. The wall 44 closes the channels 20, 22 of the adjustable portion 14.

Figure 2:
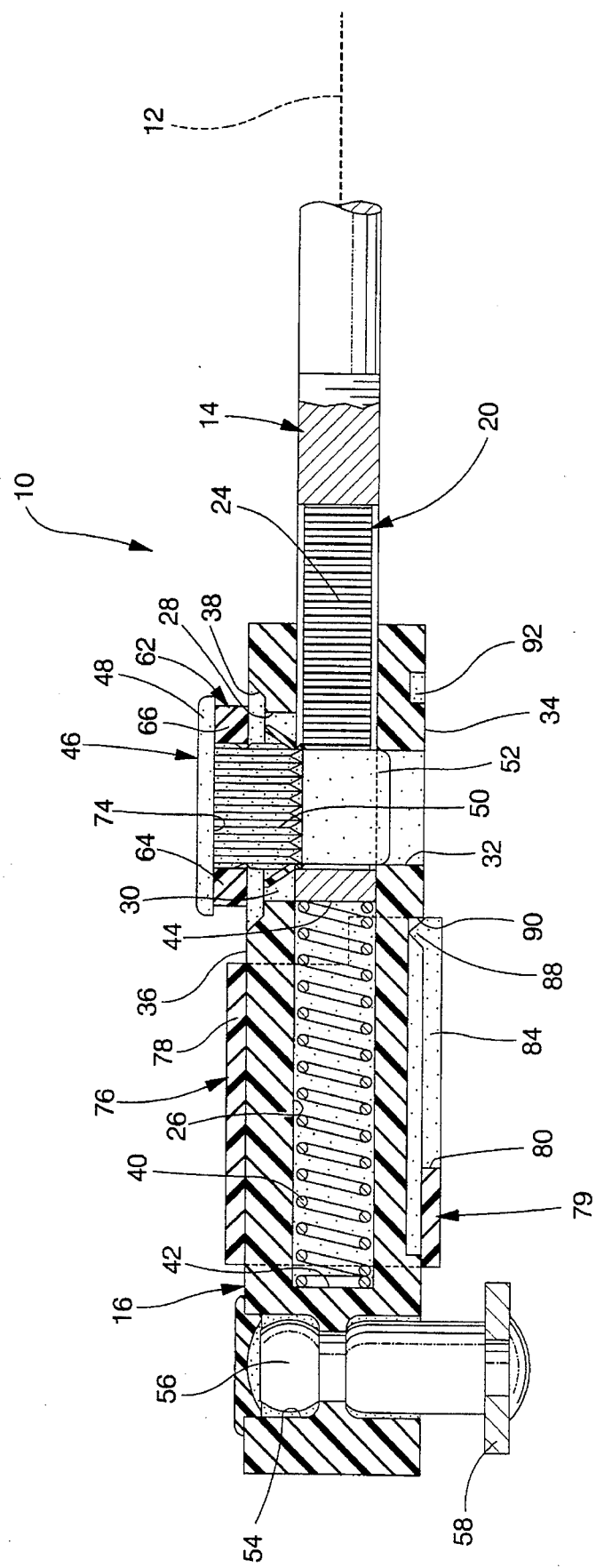
FIG. 2 is a sectional view taken along line 2—2 of FIG. 1.

The spring 40 urges the adjustable portion 14 outwardly from the opening 26. To prevent the adjustable portion 14 from being pushed completely from the opening 26, a lock member 46 is positioned in the opening 28. The lock member 46 has a button or top shelf portion 48 and a bifurcated toothed section 50 depending therefrom and lower rectangular portions 52 depending from each of the toothed sections 50. The lower rectangular portions 52 have plain or smooth sidewalls which, in the position shown in FIGS. 1 and 2, are disposed in the channels 20 and 22 adjacent the side surfaces 24. Since each portion 52 has plain surfaces, the adjustable portion 14 is movable into the opening 26. The spring 40 pushes or urges the adjustable portion 14 against the rectangular portions 52 to prevent removal from the body core 16.

The body core 16 has a socket opening 54 in which a ball and socket arrangement 56 is disposed. The ball and socket 56 is secured with a transmission control lever 58 which in turn is pivotally disposed on a conventional automatic transmission 60 to operate the manual hydraulic control valve not shown.

As is well known, the transmission input controls, such as the lever 58, are pivotally disposed to operate on a conventional detent plate which in turn moves the selector control valve linearly. The lever 58 is movable between a Park position "P" and a Low position "L" to correspond to the movement of the operator lever 18.

As shown in FIGS. 1 and 2, the cable 12 is free to move relative to the body core 16, such that the manual or operator lever 18 can be disposed in one position and the lever 58 can be disposed in a different control position. To ensure that the transmission cable mechanism disposed between the operator lever 18 and the transmission 60 is of the proper length, the levers 58 and 18 are disposed in the same shift condition, for example, Low "L", which will establish a desired length between the operator lever 18 and the lever 58. In this position, the body core 16 is locked to the adjustable portion 14, such that when the lever 18 is moved from the Low position to the Park position, the lever 58 will also be moved to the same positions and any position in between as desired by the operator.

The cable assembly 10 is assembled with the cable body core 16, the cable 12 and the lock 46, as shown in FIG. 1 and 2, prior to assembly with the transmission. Therefore, it is important to maintain the adjustable core 14 movable relative to the body core 16 until the proper alignment of the levers 18 and 58 is attained. To ensure that the lock 46 remains in an unlatched or unlocked condition, a clip 62 is positioned on the body core 16 in a manner to prevent the lock 46 from being depressed into the opening 28.

The clip 62 has a pair of arms or tines 64 and 66 which extend from a body portion 68 and are spaced apart substantially the same distance as the length of the toothed portion 50 of lock 46. The arms 64 and 66 each have a length which is slightly greater than the width of the toothed portion 50. Each arm 64 and 66 has a respective tab and 70 and 72 which presents a narrower opening and latches the clip 62 to the lock 46. The arms 64 and 66 are disposed under a lip or shelf 74 formed on the lock 46 on the bottom side of the button 48 adjacent the toothed portion 50. The arms 64 and 66 are disposed between the shelf 74 and the upper surface of the body core 16. This prevents depression of the lock 46 prior to removal of the clip 62.

Slidably disposed on the body core 16 is a cover or secondary lock member 76. The cover member 76 has a top surface 78 which covers a portion of the body core 16. A bottom surface 79 of the cover 76 has a slot 80 formed therein which is substantially the same width as the width of the lower portions 52 of the lock 46. The surface 79 has a pair of arms 82 and 84 defining the slot 80 which extend along the lower surface of the body core 16. Each arm 82 and 84 has a latch or tab 88 which engages a shelf or shoulder 90 formed on the body core 16 to inhibit sliding thereon. The body core 16 has a pair of recesses 92 disposed on the opposite side of the opening 28 from the shoulder 90, the purpose of which will become more evident later.

Figure 3:
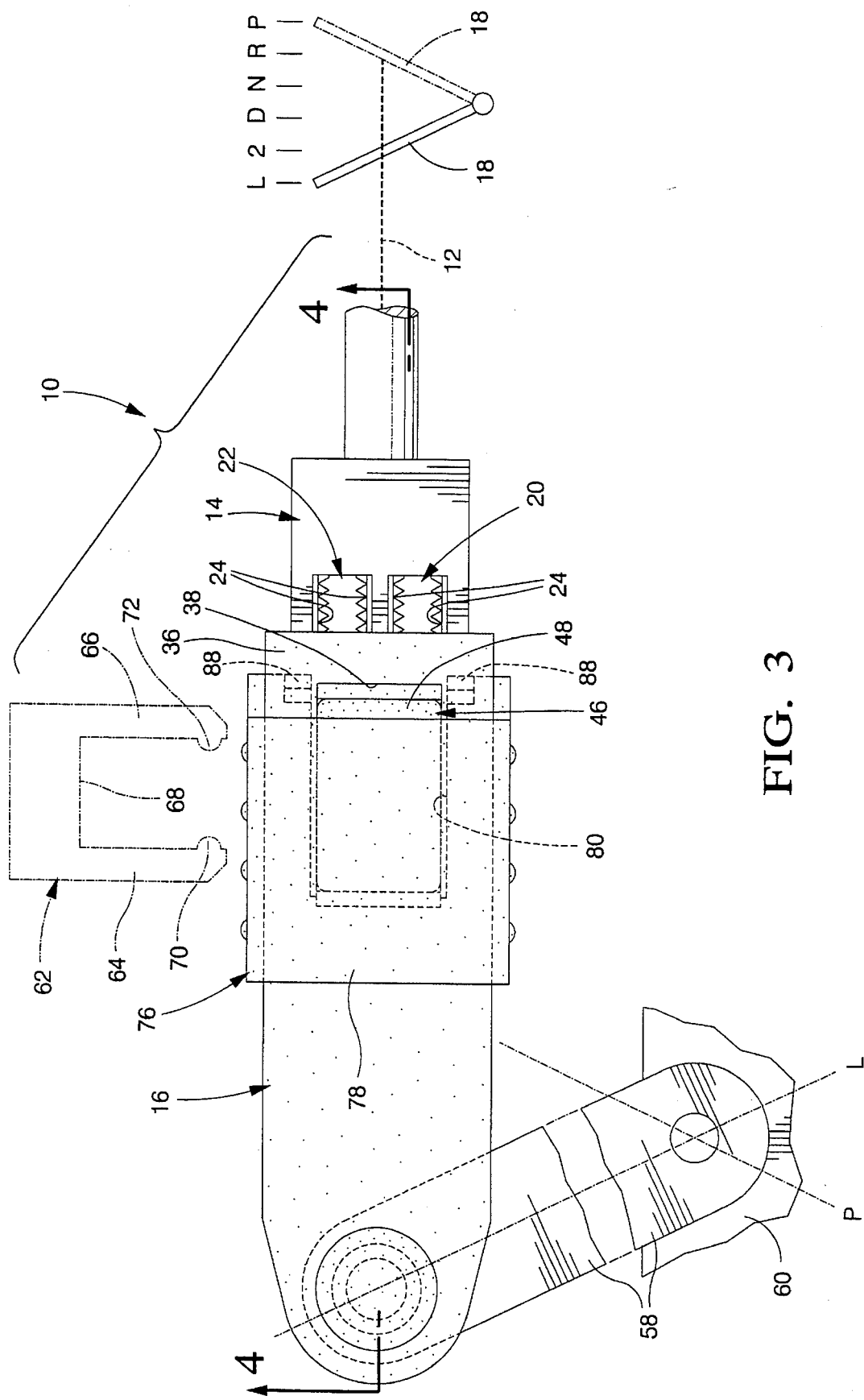
FIG. 3 is a view similar to FIG. 1 showing the cable assembly in the adjusted position.

Therefore, as seen in FIGS. 1 and 2, prior to assembly between the lever 18 and the transmission control lever 58, the cable assembly 10 may be adjusted in length. After the cable assembly 10 has been positioned between the levers 18 and 58, the clip 62 is removed, as seen in FIG. 3, and the adjustable portion 14 is moved relative to the body core 16 to ensure that the cable assembly 10 is at the proper length between the levers 18 and 58 when the desired transmission operating condition (i.e. "L") is attained. At this position, the lock 46 is depressed in the opening 28, such that the toothed surfaces 50 engage the toothed side surfaces 24 thereby preventing further adjustment between the adjustable portion 14 and the body core 16. When the lock 46 is depressed, the button 48 fits in the opening 28, such that the upper surface of the button 48 is substantially flush with the upper surface of the body core 16.

Figure 4:
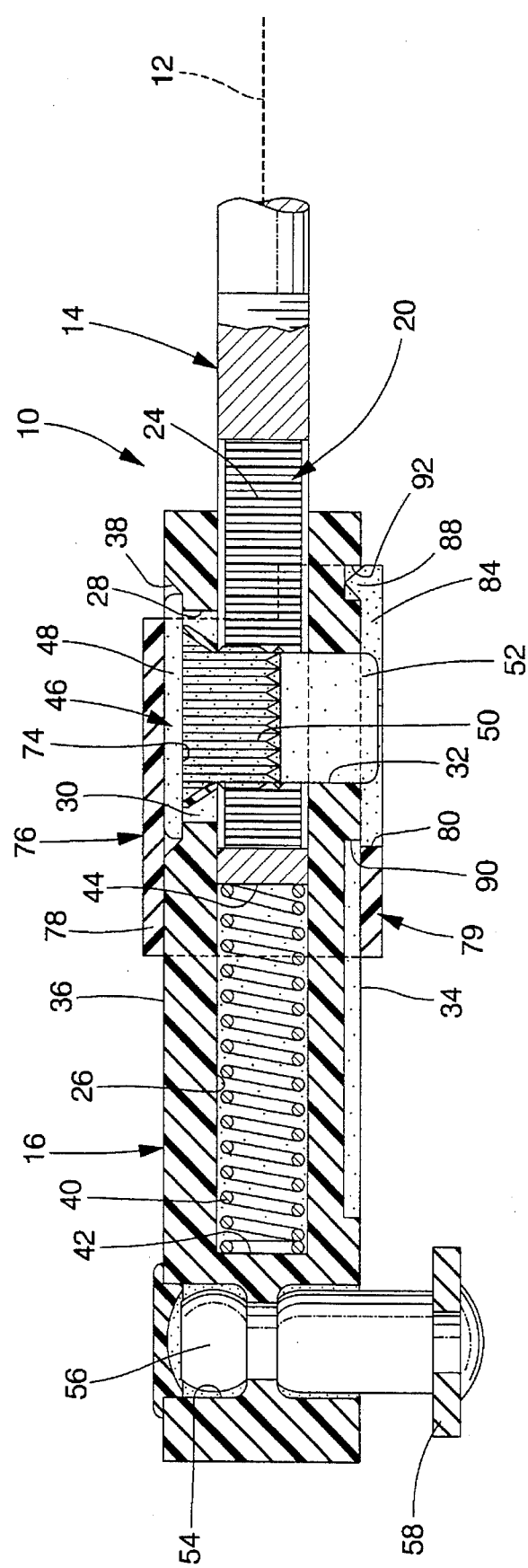
FIG. 4 is a view taken along line 4—4 of FIG. 3.

As seen in FIG. 4, the spring 40 is compressed to permit the adjustment in length required of the cable assembly 10. When the cable assembly length has been established, the cover 76 is slid along the body core 16 releasing the tabs 88 from the shoulders 90 and permitting the cover 76 to overlap the button 48 and the tabs 88 to engage in the recesses 92. This engagement between the tabs 88 and recesses 92 prevents inadvertent removal of the cover 76 and substantially ensures that the cable adjustment will remain as established by the assembler thereby securing the desired cable length in the cable assembly 10. Therefore, it should be apparent that between the clip 62 and the cover 76 the cable length is not established until final assembly with the transmission and after the length is established, the inadvertent change of cable length is not permitted.

We claim:

1. A cable adjustment mechanism comprising:

a cable body member having a first toothed locking structure formed thereon;

a cable core member having a second toothed locking structure formed thereon;

a lock member for engaging both said first and second toothed locking structures to secure a positional relation between said cable body member and said cable core member; and a cover member formed separately of said lock member and disposed on said cable core member for selectively overlapping said lock member to prevent disengagement of said lock member from said first and second toothed locking structures and including a top surface for covering said lock member and a bottom surface including two arm, each having tab means disposed thereon for selective engagement with shoulder means defined on said cable core member to secure said cover member in overlapping relationship with said lock member.

2. A cable adjustment mechanism comprising:

a cable body member having first tooth means for providing a locking structure;

a cable core member having second tooth means for providing a locking structure;

a lock member for engaging both said first and second tooth means to secure a positional relation between said cable body member and said cable core member; and a cover member formed separately of said lock member and disposed on said cable core member for selectively overlapping said lock member to prevent disengagement of said lock member from said first and second tooth means and including a top surface for covering said lock member and a bottom surface including two arms, each having tab means disposed thereon for selective engagement with shoulder means defined on said cable core member to secure said cover member in overlapping relationship with said lock member.

* * * * *